Oct. 23, 1928.
J. L. HENRY
1,688,927
FIGURE WHEELED TOY
Original Filed Sept. 17, 1926
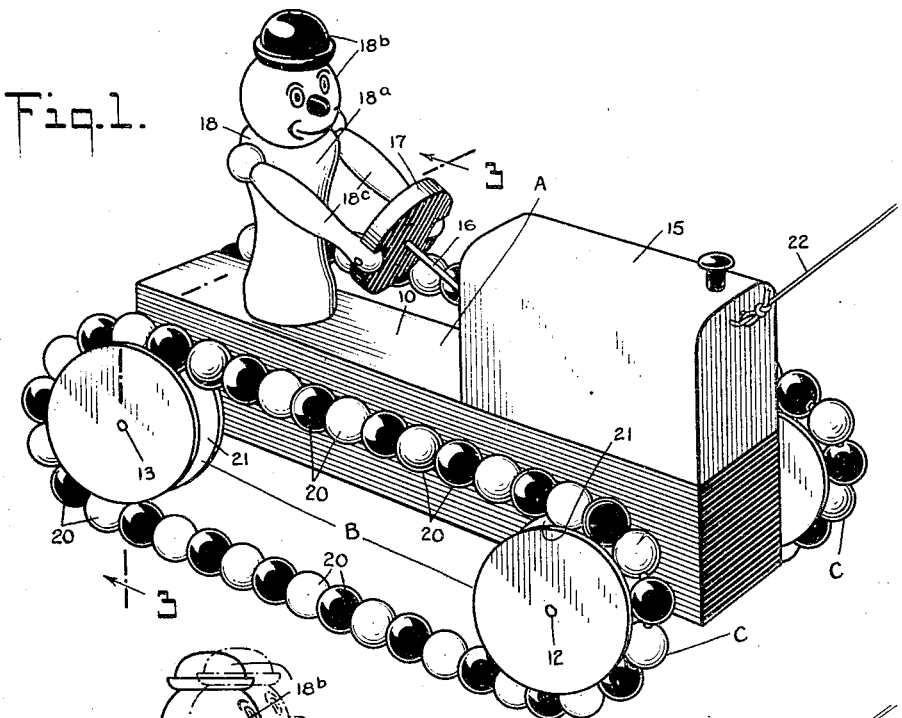
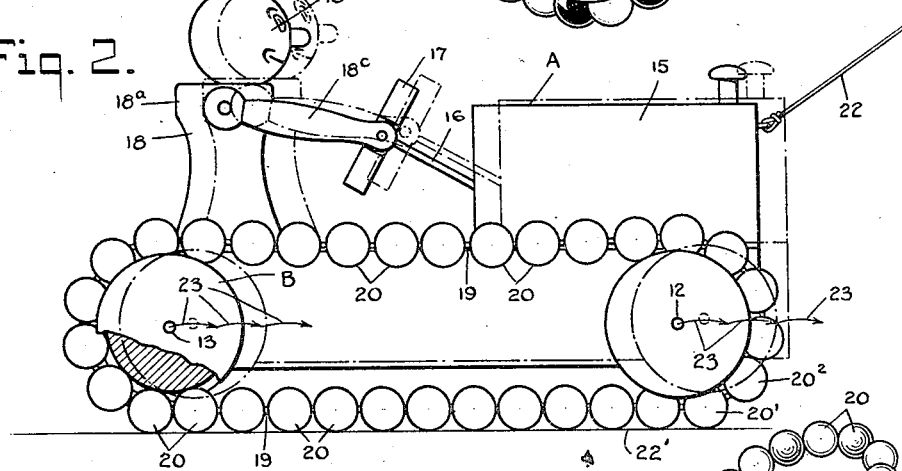
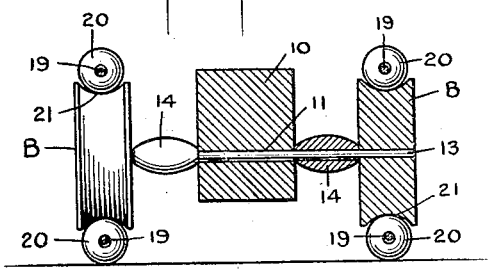
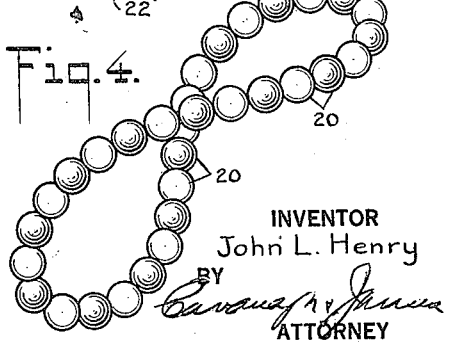
INVENTOR
John L. Henry
BY
ATTORNEY Patented Oct. 23, 1928.

1,688,927

UNITED STATES PATENT OFFICE.

JOHN L. HENRY, OF ALBANY, TEXAS.

FIGURE WHEELED TOY.

Application filed September 17, 1926, Serial No. 136,018. Renewed February 28, 1928.

This invention relates to a vehicle toy, and has special reference to the provision of a vehicle toy simulating a tractor.

The prime desideratum of my present invention comprehends the provision of a vehicle toy made in simulation of a tractor which is characterized by a construction and operation or action which is interestingly attractive and amusing to the child.

In carrying out this principal desideratum, my invention comprehends more specifically the provision of a vehicle toy simulating a tractor in which the traction belts comprise endless members having a plurality of differently colored traction defining elements for producing a variegated or multi-colored display during movement of the tractor or vehicle; the further provision of a simulated tractor in which the tractor belts are formed of strings of beads which are removably receivable by the wheels of the tractor vehicle; the still further provision of a tractor-simulating vehicle of this nature embodying tractor belts formed of strung beads having a construction such as to produce a series of intermittent movements in simulation of tractor movement when the vehicle is drawn along a support; and the still further provision of a vehicle toy of this character provided with removable tractor belts constructed so that upon removal of the belts the vehicle and tractor belts may be used as separate toys.

Still further objects of the invention center about the provision of a vehicle toy designed and constructed so as to be made of wood manufacturable and assembleable at low cost to produce a very neat, attractive and amusing toy.

To the accomplishment of the foregoing and such other objects as will hereinafter appear, my invention consists in the elements and their relation one to the other, as hereinafter more particularly described and sought to be defined in the claims; reference being had to the accompanying drawings which show the preferred embodiment of my invention, in which:

Fig. 1 is a perspective view of the simulated tractor toy embodying my invention, Fig. 2 is a side elevational view thereof showing the character of movement imparted to the toy during operation thereof, Fig. 3 is a view taken in cross-section in the plane of the line 3—3, Fig. 1, and Fig. 4 is a view showing a tractor belt defining a string of beads.

Referring now more in detail to the drawings, the simulated tractor toy of my invention comprises a vehicle body generally designated as A made to simulate a chassis and provided with the front and rear wheels generally denoted as B over which are trained the traction belts generally designated as C, which traction belts comprise endless members having a plurality of differently colored traction defining elements for producing a variegated or multi-colored display during movement of the vehicle.

The vehicle body A in the construction exemplified in the drawings is formed of a longitudinal block 10 which may be made of wood, which block is provided with spaced bores 11 for receiving the front and rear axles 12 and 13 respectively, on which axles the wheels B are mounted, bead members 14, 14 being received by said axles and being located between said wheels and said block for spacing the wheels from the block as clearly shown in Fig. 3 of the drawings. The block 10 is preferably provided at its front end with a second and shorter block 15 mounted thereon and formed to simulate a radiator hood, from which block 15 projects a rod 16 carrying a disk or wheel 17 simulating a steering wheel. To the rear of the block 10 is mounted the figure 18 simulating the driver also preferably made of wood parts, the said figure including a body block 18$^a$, a head and cap 18$^b$, and arms 18$^c$ connecting the body block 18$^a$ with the simulated steering wheel 17.

As heretofore mentioned, in carrying out the prime desideratum of the invention I provide a toy tractor in which the traction belts comprise endless members having a plurality of differently colored traction defining elements for producing a variegated or multi-colored display during movement of the tractor or vehicle, the said tractor belts comprising in the preferred construction strings of vari-colored beads designed and constructed to produce a series of intermittent movements of the vehicle when the same is drawn along a support so as to simulate tractor movement, the construction being preferably such that the tractor belts are removably attachable to the vehicle so as to afford an additional feature of amusement to the child and so as to provide for the use of the tractor belts and vehicle as separate toys when the tractor belts are removed.

To accomplish these various objects, each of the tractor belts C comprises a string of beads including an endless resilient cord 19 and a series of beads 20, 20 strung on said cord, the resiliency of said cord being such that the belts are expansible and contractible so that they may be removably trained over the front and rear wheels B, B. The beads 20, 20 are preferably, though not necessarily, spherical in contour; and the wheels B are grooved as at 21 for receiving the said spherical beads and for guiding the same during movement thereof. For producing the variegated display during movement of the vehicle, differently colored beads are provided, as indicated in Fig. 1 by the illustration of the alternate black and white beads; although it will be understood that in practice these beads are made of various colors, such as the colors of the spectrum, and are arranged in series so that movement of the tractor belts produces a very attractive changeable color effect.

When the vehicle is moved along a support such as the ground by a pull or draw string 22, a series of intermittent or jerky movements is imparted to the vehicle in natural semblance of the movement of a tractor. By reference to Fig. 2 of the drawings it will be seen that this movement is produced by virtue of the configuration and arrangement of the beads 20 on the cord or string 19, movement of the vehicle causing the front wheels to pivot about the frontmost bead such as 20' until a succeeding bead such as 20² is moved into contacting relation with the support or ground 22', causing the axles 12 and 13 to move in a locus defined by successive arcs depicted by the arrows 23, 23 in Fig. 2. A series of intermittent movements is thus imparted to the vehicle, as graphically shown by the full and dotted lines in Fig. 2 of the drawings, in simulation of tractor operation.

It will be noted that the tractor belts C, C may be readily removed by the child and that upon removal such tractor belts, as shown in Fig. 4, may be used as a string of vari-colored beads while the vehicle may be employed as an ordinary vehicle movable on the wheels B, B when the same is drawn or propelled along the ground. In this way the parts of the toy may be used as separate toys and such parts may be assembled by the child to produce the completed tractor structure shown in Fig. 1.

The manner of making and operating the simulated tractor toy of my present invention and the advantages thereof in providing interesting amusement for the child as well as in producing a toy which may be manufactured and assembled at low cost will in the main be fully apparent from the above detailed description thereof. It will be further apparent that the tractor belts when made in the form of strings of beads, besides affording the uses and advantages hereinbefore referred to, permit of the manufacture of a tractor toy salable at an exceedingly low figure. It will be apparent that this construction furthermore permits manufacturing of the entire toy from wood or like material, producing a very attractive appearance. It will be further apparent that while I have shown and described my invention in the preferred form, many changes and modifications may be made in the structure disclosed without departing from the spirit of the invention, defined in the following claims.

I claim:

1. A vehicle toy simulating a tractor comprising a vehicle body, a pair of front wheels and a pair of rear wheels thereon, and traction belts trained over and connecting the front and rear wheels, each traction belt comprising an endless cord and beads having bores therethrough, said beads being loosely strung on said cord, said beads defining the traction elements.

2. A vehicle toy simulating a tractor comprising a vehicle body, a pair of front wheels and a pair of rear wheels thereon, and traction belts trained over and connecting the front and rear wheels, each traction belt comprising an endless cord and spherical beads strung on said cord, said beads defining the movable traction elements and said wheels being grooved for receiving the said spherical beads and for guiding the same during movement thereof.

3. A vehicle toy simulating a tractor comprising a vehicle body, a pair of front wheels and a pair of rear wheels thereon, and traction belts trained over and connecting the front and rear wheels, each traction belt comprising an endless resilient cord and differently colored beads strung on said cord, said beads defining the movable traction elements and producing a variegated display during movement of the vehicle, said traction belts being removably attachable to said wheels.

4. A vehicle toy simulating a tractor comprising a vehicle body, a pair of front wheels and a pair of rear wheels thereon, and traction belts trained over and connecting the front and rear wheels, each traction belt comprising an endless cord and beads defining the traction elements strung on said cord, said beads having a configuration and being spaced on said cord to produce a series of intermittent movements of the vehicle.

5. A vehicle toy simulating a tractor comprising a vehicle body, a pair of front wheels and a pair of rear wheels thereon and traction belts trained over and connecting the front and rear wheels, each traction belt comprising an endless resilient cord and beads defining the traction elements strung on said cord, said traction belts being removably attachable to said wheels.

6. A vehicle toy simulating a tractor comprising a vehicle body, a pair of front wheels and a pair of rear wheels thereon, and traction belts trained over and connecting the front and rear wheels, each traction belt comprising an expansible and contractible endless cord and spherical beads defining the traction elements strung on said cord, said vehicle being grooved for receiving the said beads and said traction belts being removably attachable to said wheels, the construction being such that upon removal of said belts the wheeled vehicle and strings of beads may be used as separate toys.

7. A vehicle toy simulating a tractor comprising a vehicle body, a pair of front wheels and a pair of rear wheels thereon, and traction belts trained over and connecting the front and rear wheels, each traction belt comprising an expansible and contractible endless cord and differently colored beads defining the traction elements strung on said cord, said traction belts being removably attachable to said wheels and said beads producing a variegated display during movement of the vehicle.

8. A vehicle toy simulating a tractor comprising a vehicle body, a pair of front wheels and a pair of rear wheels thereon, and traction belts trained over and connecting the front and rear wheels, each traction belt comprising an endless member having a plurality of differently colored contiguously arranged traction defining elements having bores therethrough, said traction defining elements being loosely strung on said endless member for producing a variegated or multi-colored display during tractor movement.

Signed at Berkeley, in the county of Alameda and State of California, this fifth day of August A. D. 1926.

JOHN L. HENRY.